US012800306B2

(12) United States Patent
Burdess et al.

(10) Patent No.: US 12,800,306 B2
(45) Date of Patent: Nov. 17, 2026

(54) SURFACE ACOUSTIC WAVE GYROSCOPE

(71) Applicant: The University of Newcastle Upon Tyne, Tyne and Wear (GB)

(72) Inventors: James Burdess, Tyne and Wear (GB); Barry Gallacher, Tyne and Wear (GB)

( * ) Notice: Subject to any disclaimer, the term of this patent is extended or adjusted under 35 U.S.C. 154(b) by 532 days.

(21) Appl. No.: 18/269,286

(22) PCT Filed: Dec. 21, 2021

(86) PCT No.: PCT/GB2021/053392
§ 371 (c)(1),
(2) Date: Jun. 22, 2023

(87) PCT Pub. No.: WO2022/136861
PCT Pub. Date: Jun. 30, 2022

(65) Prior Publication Data

US 2024/0068811 A1 Feb. 29, 2024

(30) Foreign Application Priority Data

Dec. 22, 2020 (GB) ...................................... 2020426

(51) Int. Cl.
*G01C 19/5698* (2012.01)

(52) U.S. Cl.
CPC ................................ *G01C 19/5698* (2013.01)

(58) Field of Classification Search
CPC ................................................. G01C 19/5698
See application file for complete search history.

(56) References Cited

U.S. PATENT DOCUMENTS

| | | | | |
|---|---|---|---|---|
| 4,384,409 A * | 5/1983 | Lao | G01P 3/44 310/313 R |
| 6,516,665 B1 * | 2/2003 | Varadan | H03H 9/02645 310/313 R |
| 9,091,544 B2 * | 7/2015 | Johari-Galle | G01C 19/5698 |
| 10,746,548 B2 * | 8/2020 | Gregory | G01C 19/5684 |
| 2012/0227487 A1 * | 9/2012 | Ayazi | G01C 19/56 216/6 |
| 2015/0000399 A1 * | 1/2015 | Lee | G01C 19/5698 73/504.01 |

(Continued)

FOREIGN PATENT DOCUMENTS

GB 2 379 506 A 3/2003

OTHER PUBLICATIONS

International Search Report and Written Opinion dated Jun. 1, 2022, in connection with International Application No. PCT/GB2021/053392.

(Continued)

*Primary Examiner* — Mark A Shabman
(74) *Attorney, Agent, or Firm* — Baker, Donelson, Bearman, Caldwell & Berkowitz, PC

(57) ABSTRACT

Example implementations relate to gyroscopes comprising: a cyclic symmetric proof mass for bearing on a first surface degenerate, spatially orthogonal primary and secondary modes of vibration which become coupled in response to rotation about an axis of the proof mass; at least one actuator for inducing a primary surface acoustic wave of circumferential order n associated with the primary mode; and at least one sensor for sensing a secondary surface acoustic wave of circumferential order n associated with the secondary mode.

30 Claims, 7 Drawing Sheets

100

(56) References Cited

U.S. PATENT DOCUMENTS

| | | | | |
|---|---|---|---|---|
| 2017/0074656 | A1* | 3/2017 | Tallur | G01C 19/5698 |
| 2020/0173780 | A1* | 6/2020 | Wu | G01C 19/5698 |
| 2020/0309563 | A1* | 10/2020 | Lipka | G01C 19/5698 |
| 2020/0408800 | A1* | 12/2020 | Lal | G01C 19/5698 |

OTHER PUBLICATIONS

British Search Report dated Jun. 14, 2021, in connection with British Application No. GB 2020426.9.
Jose et al., Surface acoustic wave MEMS gyroscope. Wave Motion. 2022. 36(4):367-381.
Johari, H. and Ayazi, F. Capacitive bulk acoustic wave silicon disk gyroscopes. 2006 International Electron Devices Meeting, San Francisco, CA, USA, 2006, pp. 1-4, doi: 10.1109/IEDM.2006.346827.

* cited by examiner

100

200

300

400

500

600

700

SURFACE ACOUSTIC WAVE GYROSCOPE

CROSS-REFERENCE TO RELATED APPLICATIONS

This Application is a national stage filing under 35 U.S.C. § 371 of International Patent Application Serial No. PCT/GB2021/053392, filed Dec. 21, 2021, which claims priority to Great Britain application number 2020426.9, filed on Dec. 22, 2020. The entire contents of these applications are incorporated herein by reference in their entirety.

BACKGROUND

MEMS gyroscopes are unable to measure angular rate whilst under linear accelerations in excess of, for example, 20000 g. Accelerations of this magnitude are common in smart munitions and missile systems. Current gyroscopes comprise fragile, beam-like, support structures that fail during such high accelerations. Mechanical stops can be used to prevent failure in a MEMS ring gyroscope. However, using such mechanical stops compromises performance such as angular rate measurement capability. Gyroscopes lacking an ability to measure angular rate whilst under linear accelerations in excess of 20000 g exist in all shell based geometries and include all ring and cylinder gyroscopes.

Despite the huge investment internationally over the last decade in improving the performance of micro gyroscopic sensors, the challenge of providing angular rate measurement under extreme acceleration remains.

BRIEF DESCRIPTION OF THE DRAWINGS

Example implementations will now be described by way of example only with reference to the accompanying drawings in which.

DETAILED DESCRIPTION OF EXAMPLE IMPLEMENTATIONS

Figure 1:
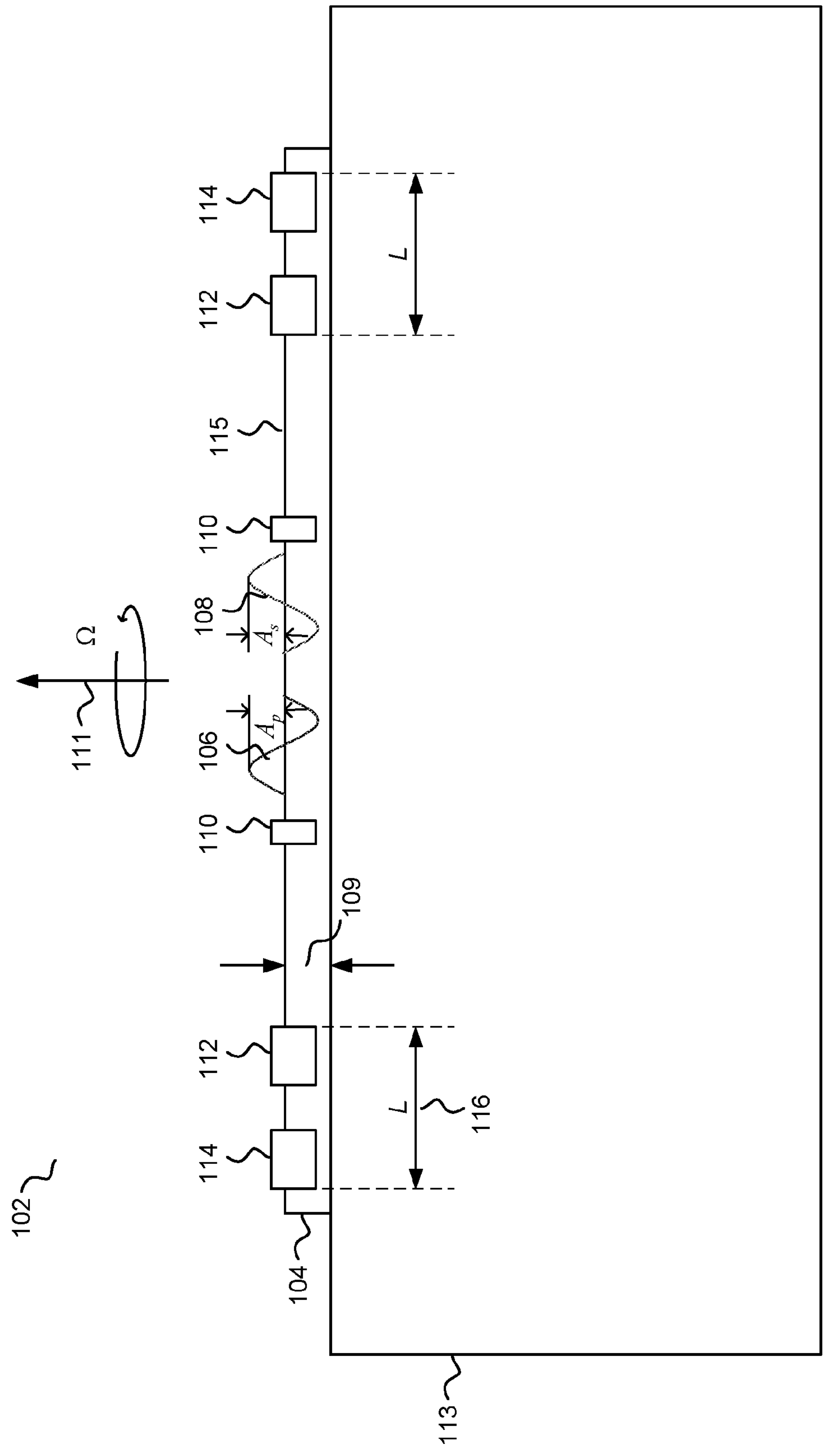
FIG. 1 shows a gyroscope according to example implementations.

Referring to FIG. 1, there is shown a view 100 of a gyroscope 102 according to an example implementation. The gyroscope comprises a proof mass 104 for bearing at least a pair of spatially orthogonal surface acoustic waves 106 and 108. The pair of spatially orthogonal surface acoustic waves are merely illustrated schematically. The mass 104 bears at least one or more than one transducer or actuator 110. The one or more than one transducer or actuator 110 is operable to produce the pair of orthogonal surface acoustic waves 106 and 108. The spatially orthogonal surface acoustic waves represent the primary and secondary modes of vibration or oscillation of the mass 104.

Example implementations can be realised in which the pair of surface acoustic waves 106 and 108 are Rayleigh surface acoustic waves. Example implementations can be realised in which the pair of surface acoustic waves are standing surface acoustic waves such as, for example, modally degenerate Rayleigh surface acoustic waves.

The mass 104 can be a substantially planar cylindrical or circular mass. Therefore, it will be appreciated that the gyroscope has an axisymmetric construction or design, which ensures modal degeneracy. The axisymmetric construction increases, and, preferably, maximises, gyroscopic coupling when the primary and secondary modes of vibration are degenerate. Example implementations can be realised in which any or all examples herein have cyclic rotational symmetry.

The mass 104 can have a predetermined axial thickness 109 to improve flexural rigidity, D, in an intended direction of acceleration 111. Alternatively, example implementations can be realised in which the mass 104 is relatively thin, but sufficiently thick to bear the above surface acoustic waves, while flexural rigidity is provided by a substrate 113 (which may be of the same material as 104) that is sufficiently thick to support the mass 104 while bearing the surface acoustic waves under the accelerations of interest, which can be in excess of 20,000 g. Being able to use such a substrate 113 follows from the surface acoustic waves being confined to a single, free or upper, surface 115 of the mass 104. The flexural rigidity, D, improves proportionally to the cube of the thickness 109 of the mass 104 or of the thickness of the substrate 113.

The mass 104 also comprises at least one reflector 112. The reflector 112 can comprise a number of reflectors such as, for example, one or more than one reflector. In the illustrated schematic implementation, two reflectors 112 and 114 are depicted. Example implementations can be realised in which the at least one reflector 112 comprises a set or group of reflectors. The set or group of reflectors can comprise a plurality of reflectors. The at least one reflector 112, 114 can span a predetermined radial distance, L 116. Example implementations can be realised in which L 116 can take values from X=50 wavelengths to Y=150 wavelengths (or in terms of wavelength). It will be appreciated that the Bessel function described below with reference to equations 29 governs the precise placement of the reflectors 112, 114. However, the placement of the reflectors can be expressed in terms of Rayleigh wavelengths $\lambda_R$ since the argument in the Bessel function is $k_R.r$ where $k_R=2\pi/\lambda_R$ and r is the radial coordinate. Furthermore, the value of Y governs the overall Q-factor of the gyroscope or resonator.

Example implementations are arranged such that a reflector is, or a number of reflectors are, positioned at at least one antinode of at least one wave of the pair of surface acoustic waves 106, 108. Example implementations can be realised in which all reflectors are positioned at antinodes of at least one wave of the pair of surface acoustic waves 106, 108. Adjacent reflectors, in implementations that use a number of reflectors, are associated with adjacent or consecutive antinodes The mass 104 can be fabricated from an isotropic or anisotropic material. Examples of the mass 104 can be realised using, for example, a piezoelectric substrate or any other substrate such as, for example, glass, quartz, quartz glass, sapphire or the like.

The transducer or actuator 110 can be substantially cylindrical, circular or be otherwise arcuate. The transducer or actuator 110 can comprise a unitary structure or a number of elements. The elements can be equidistantly circumferentially positioned relative to one another. The elements can be actuated independently, synchronously in phase or with predetermined respective phase relationships. Examples of the transducer or actuator 110 can exhibit cyclic symmetry about the axis 111.

The at least one reflector 112, 114 can be substantially cylindrical or circular. The at least one reflector 112, 114 can comprise a unitary structure or a number of elements. The elements can be equidistantly circumferentially and/or radially positioned relative to one another. For example, implementations can comprise a number of concentric reflectors. Each reflector can have a respective radius or respective radii. Therefore, example implementations can be realised in which the radius of a reflector is uniform or variable. Suitably, example implementations can be realised in which one or more than one reflector has a varying radius. An instant radius of a variable radius reflector can be a function of a property of the material from which the mass 104 is fabricated. For example, the variable radii of a reflector can be a function of the crystal structure of the material from which the mass is fabricated. For example, if the material from which the mass 104 is fabricated comprises a crystal structure that influences the speed of propagation in any given direction of any excited or launched surface acoustic waves, such as the above pair of surface acoustic waves, the radii of the reflector can be varied or otherwise set to accommodate differences in the speed of wave propagation in a manner that results in the standing surface acoustic waves. It will be appreciated that the speed of propagation of any waves launched or excited by the transducer or actuator 110 will vary with direction of propagation in certain materials such as, for example, a piezoelectric material. Therefore, the radii of any given reflectors of the at least one reflector will similarly vary in a manner that results in at least one standing wave, or both standing waves, of the pair of standing waves.

The pair of surface acoustic waves 106 and 108 are degenerate surface acoustic waves. A first wave 106 of the pair of waves 106 and 108 is induced or otherwise created by the transducer or actuator 110. The resulting surface acoustic wave 106 are known as the primary mode of vibration. The rotation of the mass 104 about the axis 111 gives rise to gyroscopic coupling via Coriolis action which excites the second wave 108 of the degenerate pair 106 and 108. The resulting surface wave, excited due to rotation about the axis 111 is the secondary mode of vibration. The secondary mode standing wave is rotated relative to the primary mode standing wave relative to a reference. The primary and secondary modes of vibration are rotationally displaced relative to one another. The reference can comprises one or more than one of the reflectors operable as a sensor.

One or more than one reflector of the at least one reflector can have a predetermined cross-sectional profile. Example implementations can be realised in which the predetermined cross-sectional profile is arranged to influence a predetermined type of reflection. For example, example implementations can be realised in which the profile of one or more of the reflectors is shaped to reflect surface acoustic waves in preference to bulk waves.

Figure 2:
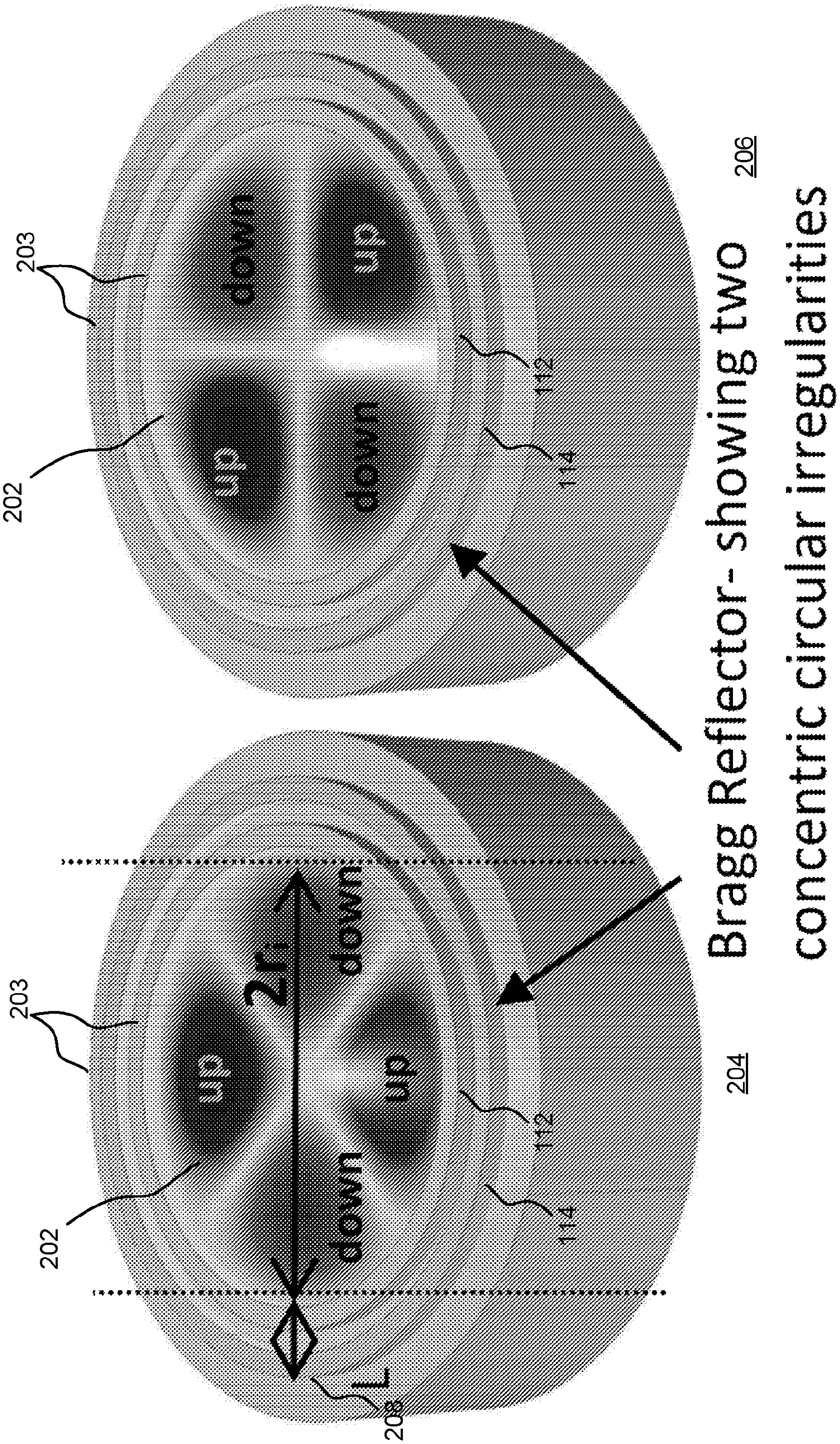
FIG. 2 illustrates operation of gyroscopes according to example implementations.

Referring to FIG. 2, there is shown a pair of views 200 of the mass 104, with or without the additional substrate 113. It will be appreciated that the surface of the mass 104 is semi-infinite and arranged to comprise a circular central region or cavity 202 of radius, $r_i$. The central region 202 is bounded by a finite set of reflectors 203. The reflectors 203 are examples of the above reflectors 112, 114. The set of reflectors is an example of a set of irregularities of radial width, L. Such a set of irregularities or such a finite set of reflectors is an example of an irregularity or reflector region 208.

The surface waves, or a surface wave, generated by the transducer 110 has an amplitude that varies circumferentially as $e^{in\theta}$, which travels outwardly towards the reflectors. The reflectors 112, 114, 203 are positioned at antinodes of the surface wave. Therefore, example implementations can be realised in which the reflectors are separated by a distance that is, or is of the order of, half a wavelength of an incident surface acoustic wave, which improves the reflection of the incident surface acoustic wave back towards the central region 202. Due to the axisymmetric arrangement, two spatially independent displacement fields, or the standing surface acoustic waves, are produced such that at resonance the standing surface acoustic waves share the same frequency, ω, that is, they are degenerate. Therefore, if a vertical displacement field of mode one varies circumferentially as cos(nθ), the displacement field of mode two will vary as sin(nθ), as shown by the left-hand and right-hand figures 204 and 206 for the case where n=2.

The gyroscope sensitivity can be improved or is influenced by adopting an axis-symmetric form for the mass 104 and cavity 202 formed by the reflectors 203, and generating primary surface acoustic waves in which the radial and vertical displacements vary circumferentially as cos(nθ). The cavity 202 and reflectors 203 form a resonator. In such an arrangement, a Coriolis inertial load, caused by the interaction between the primary surface acoustic wave and an applied angular rate about the axis 111, produces a resonant secondary response in which the radial and vertical displacement vary circumferentially as sin(nθ). For an angular rate of turn, Ω, about the axis 111 and a set primary amplitude, $A_p$, of the primary surface acoustic wave, the amplitude of the secondary response, $A_s$, of a secondary surface acoustic wave is exponentially proportional to twice the nondimensional radial width l of the irregularity region 208 and is given by $$\frac{A_S}{A_P} \propto \left(\frac{\Omega}{\omega}\right) e^{2sl}$$

where s is related to the Poisson's ratio v of the medium and nondimensional height $h_0$ of the reflector by the relation $s=\beta(\upsilon)|h_0|$ where $|h_0|\leq 1$. The relation between the Lame parameters and Poisson's ratio v is well-known and is given by $$\frac{\mu}{\lambda+2\mu} = \frac{1-2v}{2-2v}.$$

For a typical value of Poisson's ratio of v=0.2, for example for fused quartz, then $\beta(v)\cong 0.2$. Example implementations can be realised in which the dimensional height of the reflector $|H_0|\cong 0.1\lambda_R$ where $\lambda_T$ is the shear wavelength. When realised in fused quartz s≅0.02.

The value of n will be determined by practical factors that influence, preferably increase or maximise, signal to noise performance of the device when operating as gyroscope. Example implementations can be realised in which the value of n will be 2,3, or 4, which provides an effective compromise between Coriolis coupling, transduction and mitigation against material anisotropy. However, n can take other values. The primary surface acoustic wave is an example of a primary displacement field and the resonant secondary response, or secondary surface acoustic wave, is an example of a secondary displacement field.

By varying the width, l, the Gain, Q of the reflector defined by $Q=e^{2sl}$ increases exponentially and a measurable secondary response, $A_s$, can be produced. An example implementation can be realised, for example, using Lead Zirconate Titanate (PZT) electromagnetic transducers operable at 10 MHz, having n=2, an inner region $r_i$⌟ 2 mm, L ⌟ $10r_i$ and a primary surface acoustic wavelength λ=400 μm. A gyroscope as described or claimed herein may have at least one or more of the following advantages taken jointly and severally in any and all permutations, the gyroscope will not need to be operated in a vacuum, the gyroscope will be simple to manufacture and the gyroscope will be structurally very robust to withstand the high acceleration loads experienced in, say, guided munitions.

The amplitudes, $A_s$ and $A_p$, can be measured using at least one transducer positioned on the upper surface of the mass 104. Alternatively, or additionally, the amplitudes can be determined using a vibrometer such as a laser vibrometer.

Figure 3:
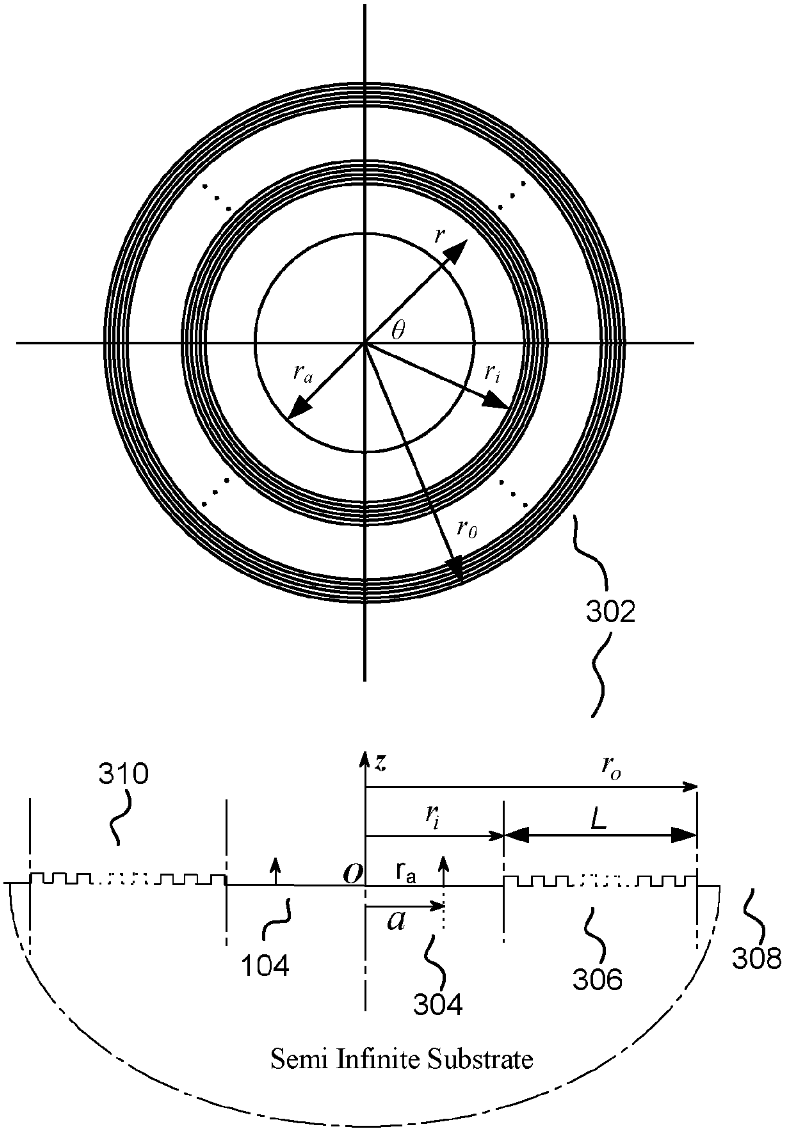
FIG. 3 shows a gyroscope according to example implementations.

Referring to FIG. 3, there is shown a view 300 of a gyroscope resonator 302 according to example implementations. The gyroscope resonator 302 is an example of the above described resonator or resonant cavity. The resonator 302 is formed from a half space occupied by an isotropic linear elastic material. The half space is an example of the above-described mass 104. FIG. 3 shows that the surface of the half space is divided into three distinct circular regions; namely, load region 304, reflector region 306 and an outer region 308, which is deposed radially outward relative to the reflector region. To describe the surface, let (R, θ, Z) represent the coordinates of a Polar coordinate system located at point O. Regions 304 and 308 are planar and the surface is defined by the plane Z=0. An annular region, that is, reflector region 306 covers the range $r_i<r<r_o=r_i+L$, which bears a number of reflectors 310. The reflectors 310 are examples of the above described reflectors 112, 114, 203. The reflectors 310 comprise a set of circular concentrically disposed ridges or grooves. The reflectors can be formed by, for example, deposition or etching. The surface of the annular region 306 can be described by $$Z = H_0 h_0(R) \tag{1}$$

where $H_0$ represents the amplitude of the reflectors or irregularities and $-1<h_0(R)<1$ describes the shape of the reflectors or irregularities. As indicated above, one or more than one reflector or irregularity can have a predetermined cross-sectional profile. Example implementations can be realised in which the predetermined cross-sectional profile is arranged to influence a predetermined type of reflection. For example, example implementations can be realised in which the profile of the one or more than one reflector or irregularity is shaped to reflect surface acoustic waves in preference to bulk waves. Example implementations can be realised in which the surface form term $h_0(R)$ is determined by increasing, preferably, maximising, reflections. The form of $h_0(R)$ can be extracted from the solution to a differential equation of the form $$D\left[Z_{p0}^{(q)}(k_R r)\right] = 0$$

where D is a differential operator governed by the displacement component utilized in the transduction, where the function $$Z_p^{(q)}$$

is the Henkel function of type q of order $p_o$, $k_R$ is the Rayleigh wavenumber and r is the non-dimensional radial coordinate.

Within the load region 304, a time-periodic, annular, line load of frequency ω, is applied to the surface at radius $r=r_a$. The line load can be applied using the above described transducer or actuator 110. The line load comprises both normal and shear components. The normal and shear components are harmonic in the co-ordinate θ. The line load is the source for generating the above described surface acoustic waves. Example implementations can be realised in which the annular line load is divided into independent circular arcs of arc length $$\frac{2\pi}{2p}$$

where p is selected depending upon the circumferential mode order n. Example implementations can be realised in which p=n with n=2, 3, 4, . . . etc.

While the analysis herein is for an isotropic elastic material, it can be extended to an anisotropic material by modifying the radial position of the line load and reflectors as a function of θ in order to take account of the in plane variation of the surface wave speed with θ.

It will be appreciated that the displacement $\underline{U}$ of any point in the half space can be expressed in terms of the scalar and vector potentials φ and $\underline{\psi}$ through the relationship, $$\underline{U} = \nabla\phi_S + \nabla\times\underline{\psi_V}, \tag{2}$$

where $\underline{\psi_V}$ is chosen to satisfy $$\nabla\cdot\underline{\psi_V} = 0 \tag{3}$$

Using these potentials, the equations of motion of the solid, that is, the surface of the mass 104 can be written as $$\nabla^2\phi_S = \frac{1}{c_L^2}\frac{\partial^2\phi_S}{\partial T^2} \text{ and } \nabla^2\underline{\psi_V} = \frac{1}{c_T^2}\frac{\partial^2\underline{\psi_V}}{\partial T^2} \tag{4}$$

where $$c_L^2 = \frac{\lambda+2\mu}{\rho} \text{ and } c_T^2 = \frac{\mu}{\rho}$$

determine the dilatational and shear waves speeds respectively as functions of the Lame constants (λ, μ), wherein λ is the first parameter of Lame, μ, is the transverse elasticity module or second parameter of Lame, ρ is the material density, and T is time period of the induced standing wave.

Dimensionless space, time and stress ($T_{\nu\kappa}$) variables are now introduced by scaling time and length using the frequency ω and the wave number $k=c_T/\omega$ and stress using the material parameter μ, which is the above described Lame second parameter, which gives the following variables $$t=\omega T,\ (r,z)=k(R,Z),\ \ell=kL,\ a=kR_a,\ \underline{u}=k\underline{U},$$
$$(\phi,\underline{\psi})=k^2(\phi_S,\underline{\psi_V}),\ \varepsilon=kH_0 \text{ and } \sigma_{vk}=T_{vk}/\mu.$$

wherein
t is dimensionless time;
T is time;
(r, z) are dimensionless radial and vertical displacements;
k(R, Z) is the shear wave number;
$\ell$ is a dimensionless radial width spanned by the irregularities;
L is the radial width spanned by the irregularities;
α is nondimensional radius of the line load, that is, the one or more than one transducer or actuator for exciting the first surface acoustic wave;
$R_a$ is the radius of the line load, that is, the one or more than one transducer or actuator for exciting the first surface acoustic wave;
$\underline{u}$ is the nondimensional displacement vector;
$(\phi, \underline{\psi})$ are the nondimensional scalar and vector displacement potentials;
$(\phi_S, \underline{\psi_V})$ are the scalar and vector displacement potentials;
ε is a nondimensional parameter as is defined by $\varepsilon=kH_0$;
$H_0$ is the dimensional height of the surface irregularities have the same height; and
$\sigma_{v\kappa}$ is the nondimensional stress component.

Example implementations can be realised in which the surface irregularities, that is, the reflectors, all have the same height. However, example implementations can also be realised in which the one or more than one surface irregularity has a different height compared to one or more than one other surface irregularity. Example implementations can be realised in which the height of the surface irregularities is at least two orders of magnitude smaller than the shear wave wavelength, $\lambda_T=2\pi/k$ of the first surface acoustic wave. In which case $\varepsilon\approx 0.01$.

Writing $\phi$ and $\underline{\psi}$ in the polar form gives:

$$\phi=\Phi(r,z)e^{i(n\theta+t)} \text{ and } \underline{\psi}=(i\Psi_r(r,z),\Psi_\theta(r,z),i\Psi_Z(r,z))e^{i(n\theta+t)}, \quad (5)$$

where the integer n represents the circumferential nodal order assigned to the motion, that is, the primary surface acoustic wave or primary field displacement of the first surface acoustic wave.

Substituting $$\Psi_r=\frac{H_1+H_2}{2} \text{ and } \Psi_\theta=\frac{H_1-H_2}{2}, \quad (6)$$

and inserting (5) and (6) into (3) and (4) allows the equations of motion of the resonator, that is the mass 104, and the divergence constraint as normal in the Helmholtz decomposition of the displacement field, to be rewritten:

$$L_n\Phi+\frac{\partial^2\Phi}{\partial z^2}+h^2\Phi=0 \quad (7)$$

-continued $$L_{n+1}H_1+\frac{\partial^2 H_1}{\partial z^2}+H_1=0$$
$$L_{n-1}H_2+\frac{\partial^2 H_2}{\partial z^2}+H_2=0$$
$$L_n\Psi_z+\frac{\partial^2\Psi_z}{\partial z^2}+\Psi_z=0$$

and $$\frac{\partial H_1}{\partial r}+\frac{(n+1)}{r}H_1+\frac{\partial H_2}{\partial r}-\frac{(n-1)}{r}H_2+2\frac{\partial\Psi_Z}{\partial z}=0,$$

where $h=\frac{c_T}{c_L}$, $L_n$ is the differential operator $$L_n=\frac{\partial^2}{\partial r^2}+\frac{1}{r}\frac{\partial}{\partial r}-\frac{n^2}{r^2},$$

$\Psi_r$ and $\psi_\theta$ are radial and tangential potential functions as defined by equation (6);
$H_1$ is a potential function as defined by equation (6);
$H_2$ is potential function as defined by equation (6);

The expressions for the displacements, i.e. $(u_r, u_\theta, u_z)$, expressed in polar coordinates, can be written in terms of the quantities $\phi$, $H_1$, $H_2$ and $\Psi_z$.

It will be appreciated that the solution becomes significantly affected by the presence of the grooves when the roughened region (L), that is, the reflector or irregularity region, is large and when the spacing between adjacent grooves, that is, adjacent irregularities or reflectors, becomes close to half that of the wavelength of the incoming surface wave.

Solution to the Unforced Problem:

The homogenous solution to the equations of motion described by equations (7) is given by $$\Phi^{(0)}=\left(A_1(\eta,\xi)Z_n^{(1)}(k_Rr)+A_2(\eta,\xi)Z_n^{(2)}(k_Rr)\right)e^{\beta_1 z},$$
$$H_1^{(0)}=-\left(B_1(\eta,\xi)Z_{n+1}^{(1)}(k_Rr)+B_2(\eta,\xi)Z_{n+1}^{(2)}(k_Rr)\right)e^{\beta_2 z}, \quad (14)$$
$$H_2^{(0)}=-\left(C_1(\eta,\xi)Z_{n-1}^{(1)}(k_Rr)+C_2(\eta,\xi)Z_{n-1}^{(2)}(k_Rr)\right)e^{\beta_2 z},$$

and $$\Psi_Z^{(0)}=-\left(D_1(\eta,\xi)Z_n^{(1)}(k_Rr)+D_2(\eta,\xi)Z_n^{(2)}(k_Rr)\right)e^{\beta_2 z}.$$

where A, B, C, D are functions determined by the boundary conditions and the divergence condition;
$k_R$ is the Rayleigh wave number, and $$\left(Z_n^{(1)},Z_n^{(2)}\right)$$

are $n^{th}$ order Hankel functions of the first and second kind respectively.

The exponents $\beta_1$ and $\beta_2$ are determined from the relationship $$k_R^2=\beta_1^2+h^2=\beta_2^2+1 \quad (15)$$

and example implementations provide for exponents $\beta_1$ and $\beta_2$ being positive to satisfy the desire that the response decays into the body of the mass 104, (z<0). The relationship between the functions $A_1(\eta, \xi)$ to $D_2(\eta, \xi)$ can be found from the solutions to:

$$(B_j - C_j)k_R - 2\beta_2 D_j = 0, \tag{17}$$

and $$\begin{bmatrix} k_R^2+\beta_2^2 & -k_R\beta_2 & -k_R\beta_2 \\ -2k_R\beta_1 & k_R^2 & \beta_2^2 \\ 2k_R\beta_1 & -\beta_2^2 & -k_R^2 \end{bmatrix} \begin{bmatrix} A_j \\ B_j \\ C_j \end{bmatrix} = \underline{0},\ j = 1, 2.$$

Equation (17) yields the result $$D(\eta, 0)_j = 0,\ B(\eta, 0)_j = C(\eta, 0)_j = pA(\eta, 0)_j \tag{18}$$

and $$pq = 1 \tag{19}$$

where the parameters p and q are defined by, $$p = \frac{2k_R\beta_1}{k_R^2+\beta_2^2} \text{ and } q = \frac{2k_R\beta_2}{k_R^2+\beta_2^2}. \tag{20}$$

If equations (15) and (20) are substituted into (19), an equation for the wave number $k_R$ is produced, which is associated with the propagation of a Rayleigh surface wave.

Solution to the Forced Problem:

For the case of the applied load at r=a, the particular solution, designated by the subscript p, is derived by first taking the Hankel transform of the equations of motion (7), equation (3) and the boundary conditions (8), rearranged as $\overline{\sigma}_{zz}=F_z\delta(r-a)$, $\overline{\sigma}_{rz}-\overline{\sigma}_{z\theta}=(F_r-F_\theta)\delta(r-a)$ and $\overline{\sigma}_{rz}+\overline{\sigma}_{z\theta}=(F_r+F_\theta)\delta(r-a)$. With the notation $$\begin{aligned} A(s)e^{\gamma_1 z} &= \int_0^\infty r\Phi_p(r, z)J_n(sr)dr \\ B(s)e^{\gamma_2 z} &= -\int_0^\infty rH_{1p}(r, z)J_{n+1}(sr)dr \\ C(s)e^{\gamma_2 z} &= -\int_0^\infty rH_{2p}(r, z)J_{n-1}(sr)dr \\ D(s)e^{\gamma_2 z} &= -\int_0^\infty r\Psi_{zp}(r, z)J_n(sr)dr, \end{aligned} \tag{21}$$

the transformation of (3), (7) and (8) gives $$\begin{aligned} \gamma_1 &= \sqrt{s^2-h^2} > 0, \\ \gamma_2 &= \sqrt{s^2-k^2} > 0, \end{aligned} \tag{22}$$

and $$\begin{bmatrix} 0 & -s & s & 2\gamma_2 \\ 2s^2-k^2 & -s\gamma_2 & -s\gamma_2 & 0 \\ -2s\gamma_1 & s^2 & \gamma_2^2 & 0 \\ 2s\gamma_1 & -\gamma_2^2 & -s^2 & 0 \end{bmatrix} \begin{bmatrix} A \\ B \\ C \\ D \end{bmatrix} = \begin{bmatrix} 0 \\ (1/\mu)aF_zJ_n(as) \\ (1/\mu)a(F_r\text{-}F_\theta)J_{n+1}(as) \\ (1/\mu)a(F_r+F_\theta)J_{n\text{-}1}(as) \end{bmatrix}$$

where from $$\begin{bmatrix} A \\ B \\ C \\ D \end{bmatrix} = \frac{aF_zJ_n(as)}{\mu M(s)} \begin{bmatrix} s^2+\gamma_2^2 \\ 2s\gamma_1 \\ 2s\gamma_1 \\ 0 \end{bmatrix} + \frac{a(F_r-F_\theta)J_{n+1}(as)}{\mu M(s)} \begin{bmatrix} s\gamma_2 \\ -\frac{s^2}{k^2}\left(-2s^2+k^2+2\gamma_1\gamma_2\right) \\ \frac{\gamma_2}{k^2}\left(-2\gamma_2 s^2+\gamma_2 k^2+2\gamma_1 s^2\right) \\ \frac{sM(s)}{2\gamma_2 k^2} \end{bmatrix} + \frac{a(F_r+F_\theta)J_{n-1}(as)}{\mu M(s)} \begin{bmatrix} -s\gamma_2 \\ -\frac{\gamma_2}{k^2}\left(-2\gamma_2 s^2+\gamma_2 k^2+2\gamma_1 s^2\right) \\ \frac{s^2}{k^2}\left(-2s^2+k^2+2\gamma_1\gamma_2\right) \\ \frac{sM(s)}{2\gamma_2 k^2} \end{bmatrix}, \tag{24}$$

and $$M(s) = \left(k^2-2s^2\right)^2 - 4s^2\gamma_1\gamma_2.$$

By using equations (19) and (20), it can be seen that $M(k_R)=0$. This highlights that the resonant solution to the forced problem is governed by Rayleigh waves as in the unforced case.

Using (24) and the Hankel inversion formula, it follows that $$\begin{aligned} \Phi_p(r, 0) &= \int_0^\infty sA(s)J_n(sr)ds \\ H_{1p}(r, 0) &= -\int_0^\infty sB(s)J_{n+1}(sr)ds \\ H_{2p}(r, 0) &= -\int_0^\infty sC(s)J_{n-1}(sr)ds \\ \Psi_{zp}(r, 0) &= -\int_0^\infty sD(s)J_n(sr)ds \end{aligned} \tag{26}$$

Substituting (24) and (25) into (26) defines the particular integrals to be evaluated to give the contribution made by the surface wave to the overall motion. Example implementations can be realised using the method of contour integration by showing that the surface wave contribution can be obtained from terms that are given by the principal part of integrals of the type:

$$I_{\kappa,\nu}(r) = \int_0^\infty \frac{G(s)}{M(s)} J_\kappa(as)J_\nu(rs)ds. \tag{27}$$

Performing this integration shows that the surface wave contribution is related to the term $$I_{\kappa,v}(r)=\begin{cases}-i\pi\frac{G(k_R)}{M'(k_R)}Z_v^{(2)}(k_Rr)J_\kappa(k_Ra),\ r>a\\ -i\pi\frac{G(k_R)}{M'(k_R)}Z_\kappa^{(2)}(k_Ra)J_v(k_Rr),\ r<a\end{cases}\quad(28)$$

In equation (28), κ and v are integers, G(s) is one of the functions shown in the first three rows of (24) and M' is the derivative of M with respect to s, evaluated at $s=k_R$. It will be appreciated that G(s) is a function that depends on which element of the matrix of solutions is being determined, and M(s) is recognized as leading to a Rayleigh wave solution as seen in the unforced problem.

To proceed further with the analysis it is convenient, without incurring loss of generality, to limit the discussion to the case where only a normal load, is applied to the surface (i.e. $F_r=F_\theta=0$). For this situation it follows, after using (24) to (28), that the surface wave motion is given by, $$\left.\begin{aligned}\Phi_p(r,z)&=A_0J_n(k_Ra)Z_n^{(2)}(k_Rr)e^{\beta_1z}\\ H_{p1}(r,z)&=-pA_0J_n(k_Ra)Z_{n+1}^{(2)}(k_Rr)e^{\beta_2z}\\ H_{p2}(r,z)&=-pA_0J_n(k_Ra)Z_{n-1}^{(2)}(k_Rr)e^{\beta_2z}\\ \Psi_{pz}(r,z)&=0\end{aligned}\right\},\ \text{for } r>a\quad(29)$$

and $$\left.\begin{aligned}\Phi(r,z)&=A_0Z_n^{(2)}(k_Ra)J_n(k_Rr)e^{\beta_1z}\\ H_1(r,z)&=-pA_0Z_n^{(2)}(k_Ra)J_{n+1}(k_Rr)e^{\beta_2z}\\ H_2(r,z)&=-pA_0Z_n^{(2)}(k_Ra)J_{n-1}(k_Rr)e^{\beta_2z}\\ \Psi_z(r,z)&=0\end{aligned}\right\},\ \text{for } r<a,$$

where $$A_0=-i\pi\frac{aF_z}{\mu}\frac{k_R(k_R^2+\beta_2^2)}{M'(k_R)}.$$

It is possible to interpret (29) by substituting it into equations (5) and (6). For r<a the response is of the form of a standing wave such as at least one, or both, of the above described first and second surface acoustic standing waves. When r>a, the asymptotic form of the Hankel function, given by $$Z_n^{(2)}(k_Rr)\sim\sqrt{\frac{2}{\pi k_Rr}}\,e^{-i(k_Rr-\pi/4-n\pi/2)},$$

shows that response can be identified as a radially expanding travelling wave, of speed $V_R=\omega/k_R$.

By suitably interpreting the results of equations (14) and (29), the form of the first order solution for the different surface regions can now be constructed.

For the region $r<r_i$, the singularity in the Hankel functions at r=0 must be removed and the solution takes the form $$\begin{aligned}\Phi^{(0)}(r,z)&=A_1(\eta,\xi)J_n(k_Rr)e^{\beta_1z}+\Phi_p(r,z)\\ H_1^{(0)}(r,z)&=-B_1(\eta,\xi)J_{n+1}(k_Rr)e^{\beta_2z}+H_{1p}(r,z)\\ H_2^{(0)}(r,z)&=-C_1(\eta,\xi)J_{n-1}(k_Rr)e^{\beta_2z}+H_{2p}(r,z)\\ \Psi_z^{(0)}(r,z)&=-D_1(\eta,\xi)J_n(k_Rr)e^{\beta_2z}\end{aligned}\quad(30)$$

Within the irregular or roughened region 208, $r_i<r<r_o$, the singularity problem in the Hankel function does not occur and the solution, which contains both the free surface and the particular solutions, can be written without loss of generality as, $$\begin{aligned}\Phi^{(0)}(r,z)&=\left(A_2(\eta,\xi)Z_n^{(1)}(k_Rr)+A_3(\eta,\xi)Z_n^{(2)}(k_Rr)\right)e^{\beta_1z}\\ H_1^{(0)}(r,z)&=-\left(B_2(\eta,\xi)Z_{n+1}^{(1)}(k_Rr)+B_3(\eta,\xi)Z_{n+1}^{(2)}(k_Rr)\right)e^{\beta_2z}\\ H_2^{(0)}(r,z)&=-\left(C_2(\eta,\xi)Z_{n-1}^{(1)}(k_Rr)+C_3(\eta,\xi)Z_{n-1}^{(2)}(k_Rr)\right)e^{\beta_2z}\\ \Psi_z^{(0)}(r,z)&=-\left(D_2(\eta,\xi)Z_{n-1}^{(1)}(k_Rr)+D_3(\eta,\xi)Z_{n-1}^{(2)}(k_Rr)\right)e^{\beta_2z}\end{aligned}\quad(31)$$

Beyond $r=r_o$ the solution represents an outwardly propagating wave and this condition can only be met by retaining terms of the type $$Z_v^{(2)}(v=n-1,n,n+1)$$

in the solution. For this region the solution is thus of the form:

$$\begin{aligned}\Phi^{(0)}(r,z)&=A_4(\eta,\xi)Z_n^{(2)}(k_Rr)e^{\beta_1z}\\ H_1^{(0)}(r,z)&=-B_4(\eta,\xi)Z_{n+1}^{(2)}(k_Rr)e^{\beta_2z}\\ H_2^{(0)}(r,z)&=-C_4(\eta,\xi)Z_{n-1}^{(2)}(k_Rr)e^{\beta_2z}\\ \Psi_z^{(0)}(r,z)&=-D_4(\eta,\xi)Z_{n-1}^{(2)}(k_Rr)e^{\beta_2z}\end{aligned}\quad(32)$$

Equation (31) can be used to determine the radial locations of the reflectors and the line load for the normal load case. The general load case can be determined by considering equation (29). For the normal case, the reflector radial positions are given by maximizing the response from the appropriate displacement component. For example, for the radial displacement u the reflector and line locations can be obtained by solving $$\frac{\partial u}{\partial r}=0.$$

In general, this will involve finding the solution to a differential equation of the form $$D\left[Z_{p0}^{(q)}(k_Rr)\right]=0$$

where D is a differential operator governed by the displacement component utilized in the transduction.

Figure 4:
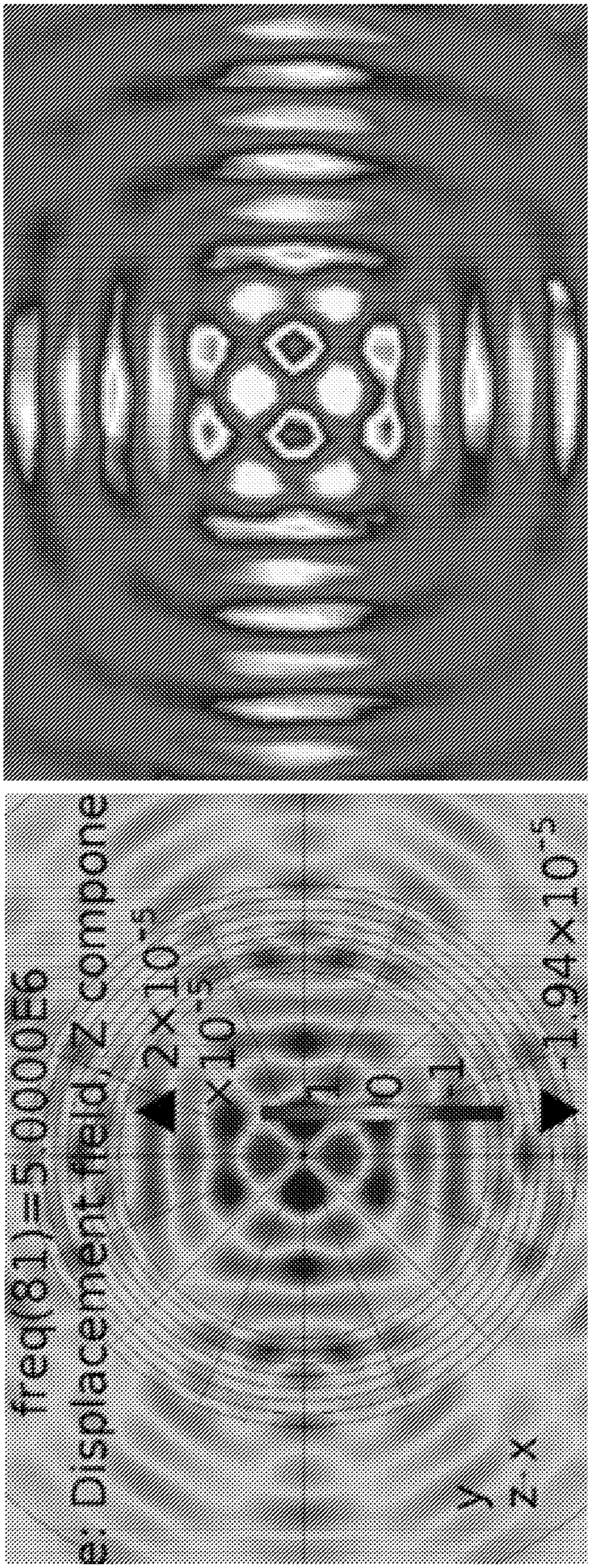
FIG. 4 depicts standing surface acoustic waves according to example implementations.

Referring to FIG. 4, there is shown a view 400 of a simulation 402 and experimental 404 results of a mass 104 bearing first and second orthogonal Rayleigh surface acoustic waves that are degenerate and coupled due to motion about an axis normal to the plane of the figure (not shown). The standing wave frequency in the simulation 402 was 5 MHz with maximum and minimum antinode amplitudes of $2\cdot10^{-5}$ m and $-1.94\cdot10^{-5}$ m. The excitation line load in FIG. 4 was split into 4 circumferential sections. The gaps between adjacent sections is clearly seen as node lines in the standing wave pattern. It can be appreciated that the simulation matches the experimental results well. The experimental results were obtained by laser vibrometry sensitive to the displacement component normal to the figure.

Figure 5:
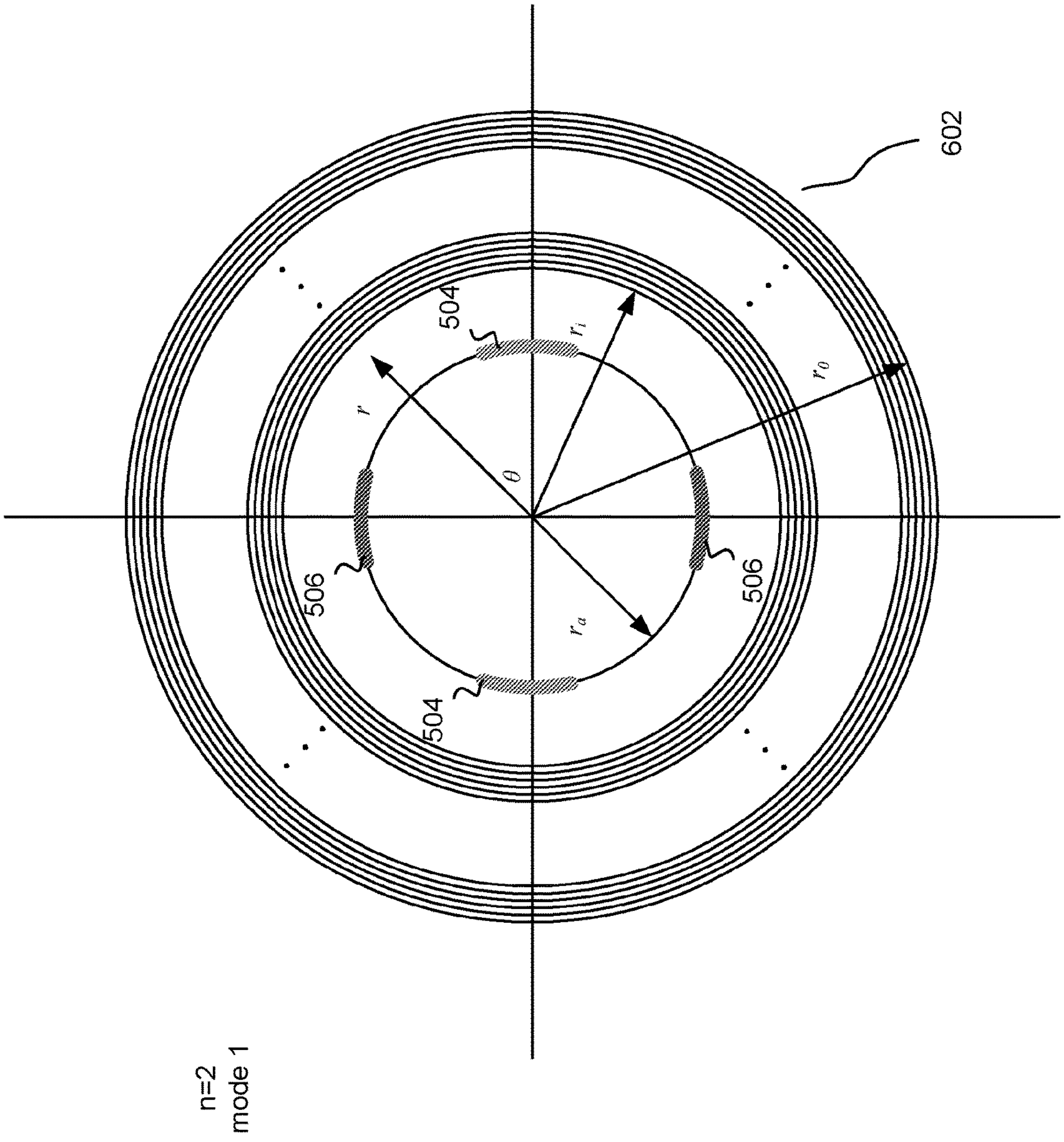
FIG. 5 illustrates a gyroscope proof mass bearing sets of transducers according to example implementations.

Referring to FIG. 5, there is shown a view 500 of the mass 502 bearing first 504 and second 506 sets of transducers or actuators for the case where n=2. The proof mass 502 is an example of any proof mass described herein such as, for example, any of the above described proof masses 104, 204, 206, 302. The transducers or actuators 504, 506 can be examples of the above described transducers or actuators 110. The first set of transducers or actuators 504 can be arranged to excite mode one of the mass 104. The transducers or actuators 504 are disposed diagonally opposite one another. In the example illustrated, the transducers or actuators 504 are positioned at 0° and 180°. The second set of transducers or actuators 506 are also disposed diagonally opposite one another. In the example depicted, the transducers or actuators 506 are positioned at 90° and 270°. Example implementations can be realised in which the first 504 and second 506 sets of transducers or actuators are disposed at a predetermined position or angular position relative to one another. In the example shown, the first 504 and second 506 sets of transducers or actuators are orthogonal to one another in physical space yet are associated with one mode of the degenerate pair of wave modes of circumferential order n=2. The set 504 is used to excite one mode of the n=2 degenerate pair. This is referred to as the primary mode of the gyroscope. The second set 506 can be used to detect the primary mode displacement or velocity. In typical rate gyroscope operation, the primary mode and its associated electrodes may be configured in closed loop control whereby the vibration amplitude of the primary mode is maintained constant.

Figure 6:
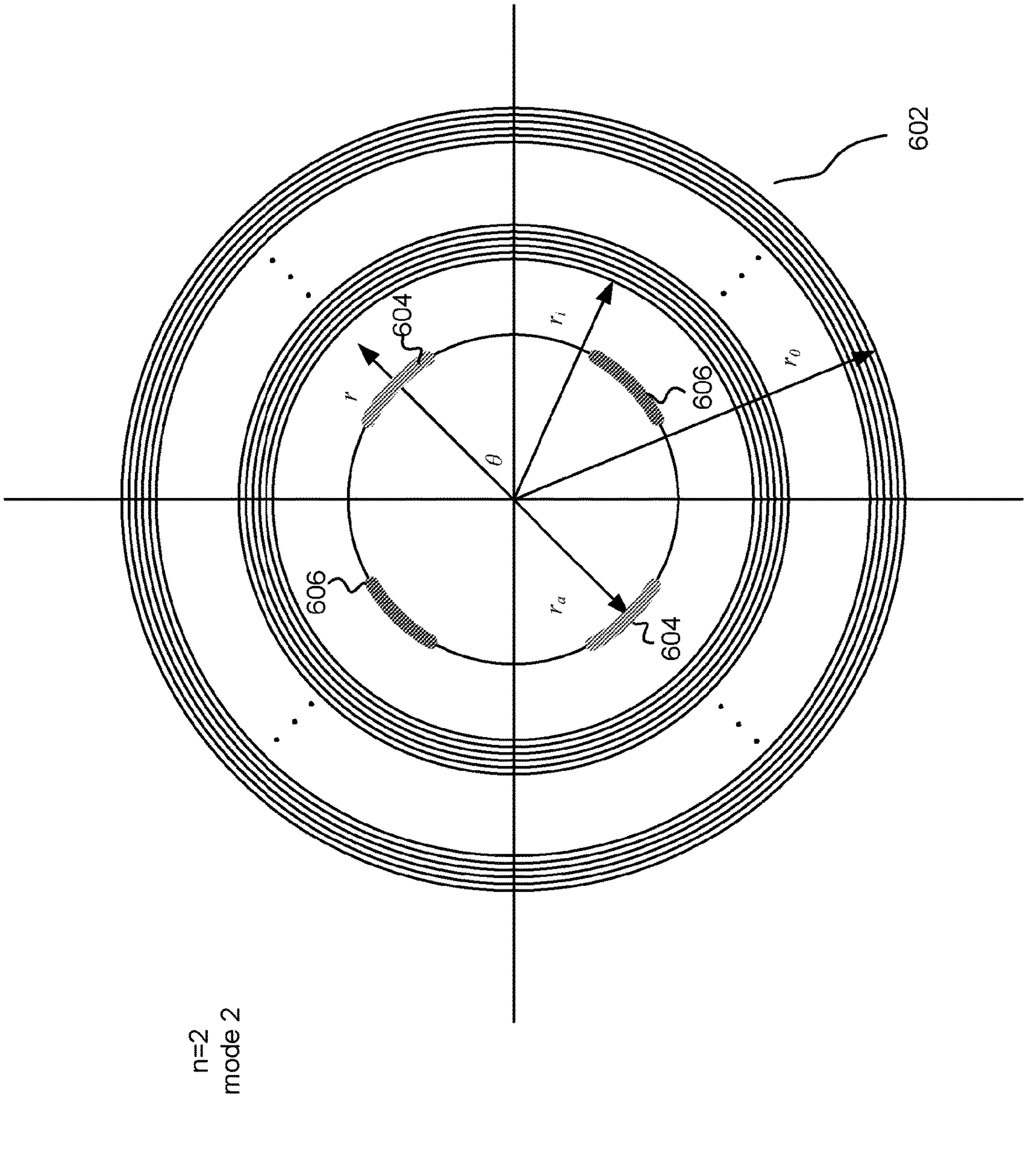
FIG. 6 shows a gyroscope proof mass bearing sets of transducers according to example implementations.

Referring to FIG. 6, there is shown a view 600 of a mass 602 bearing first 604 and second 606 sets of transducers or actuators for the case where n=2. The mass 602 is an example of the above described mass 104. The transducers or actuators 604, 606 can be examples of the above described transducers of actuators 110. In the example illustrated, the transducers or actuators 604 are positioned at 45° and 225°. The second set of transducers or actuators 606 are also disposed diagonally opposite one another. In the example depicted, the transducers or actuators 606 are positioned at 135° and 315°. Example implementations can be realised in which the first 604 and second 606 sets of transducers or actuators are disposed at a predetermined position or angular position relative to one another. In the example shown, the first 604 and second 606 sets of transducers or actuators are orthogonal to one another in physical space yet are associated with the secondary mode of the gyroscope, that is, a second or secondary mode of the degenerate pair of wave mode of circumferential order n=2, mode 2. Coriolis coupling due an angular rate applied about the axis normal to the figure causes excitation of this secondary mode of the gyroscope. Detection of the secondary mode and hence measures of the applied angular rate are obtained through employing the sets 604 or 606 either separately or in combination. The relative phase between signals produced from either 604 or 606 of 90° can be accounted for in the standard detection circuitry. Open loop operation detects the amplitude of the secondary mode's displacement or velocity. Forced feedback control where control forces are applied to 604 or 606 can be used to null the secondary mode vibration to improve measurement bandwidth and is standard practice in rate gyroscope devices. In open loop operation, the detected amplitude is proportional to the angular velocity applied about the axis normal to the plane of the figure.

Figure 7:
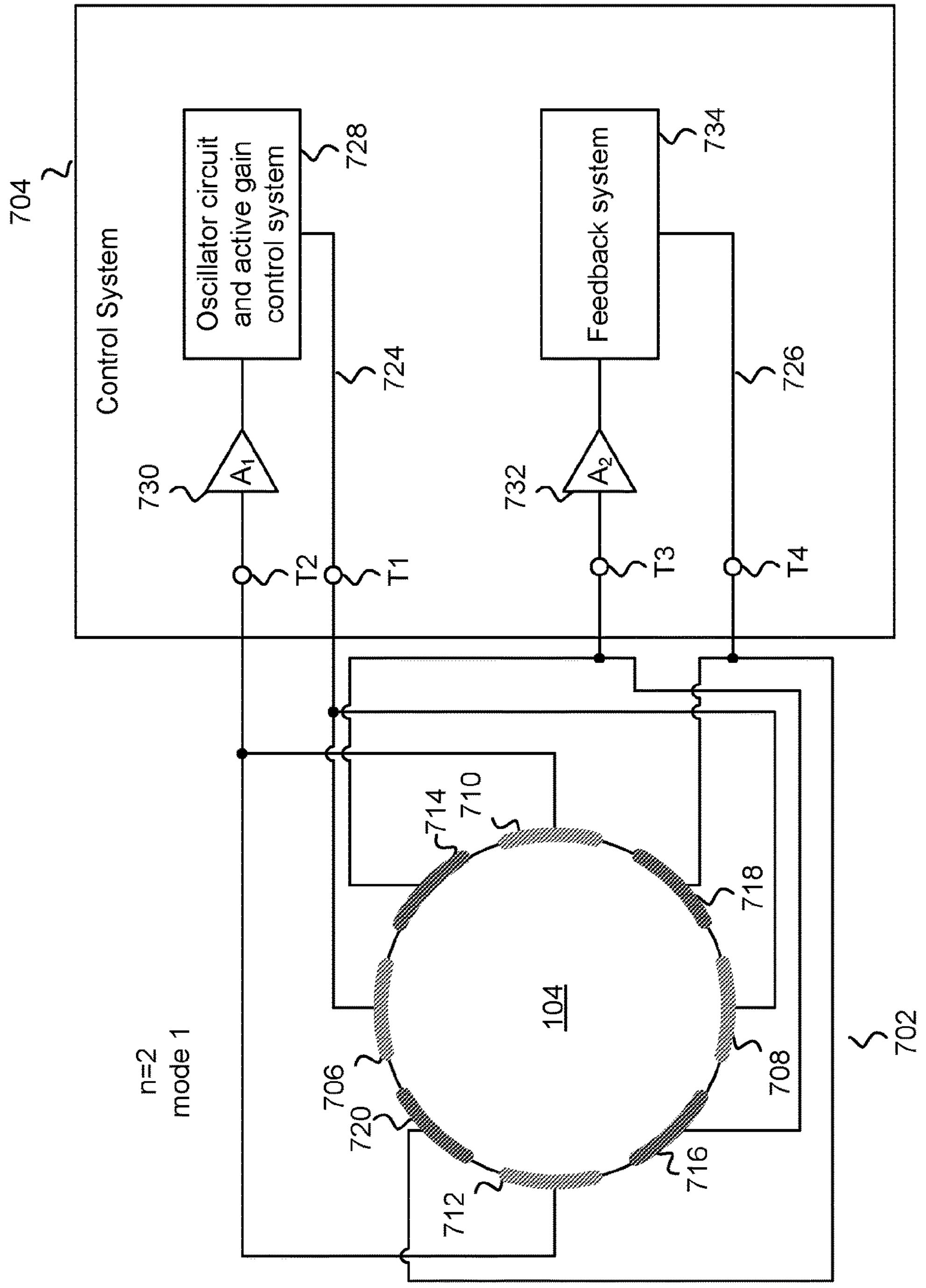
FIG. 7 depicts a gyroscope system according to example implementations.

Referring to FIG. 7, there is shown a view 700 of a gyroscope 702 according to any implementation described or claimed herein in conjunction with a control system 704. The gyroscope 702 is an example of any of the above described gyroscopes.

The gyroscope 702 comprises at least a first set of actuators or transducers 706 to 712 and at least a second set of actuators or transducers 714 to 720. An example implementation can be realised in which the gyroscope 702 comprises all eight actuators or transducers 706 to 720. The actuators or transducers are deposited on the proof mass 104. The actuators or transducers are examples of the above described actuators or transducers 110.

The control system 704 is arranged to generate control signals 724 and 726 to drive transducers or actuators. The actuators are electrically coupled in pairs. It can be appreciated that actuators or transducers 706 and 708 are electrically coupled to form a terminal T1. Actuators or transducers 710 and 712 are electrically coupled to form a terminal T2.

A drive signal is applied to the terminal T1 by a signal generator 728. The signal generator 728 can comprise an oscillator circuit and an active gain control system that generator and influence the drive signal. The drive signal excites the above described modes of oscillation, that is, the drive signals generate the above standing surface acoustic wave. The drive signal can be any drive signal that induces the above described standing surface acoustic waves. Example implementations use drive signals having a fundamental frequency corresponding to the resonant frequency of the cavity.

In response to applying the drive signal to terminal T1, the actuators or transducers cause surface acoustic waves to be generated in the surface of the proof mass 104. The surface acoustic waves actuate or influence actuators or transducers 710 and 712, which produce a feedback signal at terminal T2. The feedback signal at terminal T2 can be amplified by an amplifier 730. The feedback signal is used by the active gain control system 728 to control the drive signal at terminal T1, which has the effect of driving the proof mass to oscillate according to a respective resonant mode in which the above described standing surface acoustic waves exist.

Actuators or transducers 714 and 716 are also provide a feedback signal to a terminal T3. In the absence of rotation or rate of turn about the axis 111 of the proof mass 104, the signal at terminal T3 is zero, which follows from the actuators or transducers 714 and 716 being positioned at the above described nodes of the standing surface acoustic wave corresponding to the primary mode of the gyroscope.

However, if the proof mass 104 is rotated about the axis 111, the standing surface acoustic wave corresponding to the secondary mode of the gyroscope is excited due to the Coriolis effect which, in turn, leads to actuators or transducers 714 and 716 producing respective outputs that manifest as a signal at terminal T3. The signal at terminal T3 can be amplified using an amplifier 732. This signal provides an open-loop measure of the rotation rate. Alternatively, the signal can be used as a feedback signal and used to drive terminal T4 using control signal 726 generated by a feedback or signal conditioning system 734. Terminal T4 is electrically coupled to actuators or electrodes 718 and 720. The feedback system 734 is arranged to vary the control signal 726 so that the signal at terminal T3 is zero. When the signal at terminal T3 is zero or a near-null value, the control signal 726 is indicative of the rate of turn of the proof mass 104 about the axis 111, that is, control signal 726 is indicative of the angular velocity of the proof mass 104. The angular velocity can be derived from $$\frac{A_s}{A_p} = \left(\frac{\Omega}{\omega}\right)K(n)e^{2sl}$$

as indicated above, where K(n) is factor determined by the precise geometrical configuration and is referred to as the Bryan factor. It will be appreciated that example implementations can be realised in which $A_p$ is known, and, therefore, the amplitude $A_s$ is proportional to the angular rate.

Although example implementations have been described with reference to the surface acoustic waves being Rayleigh waves, example implementations are not limited to such arrangements. Example implementations can be realised that use other types of surface acoustic waves such as, for example, Love waves.

The invention claimed is:

1. A gyroscope comprising:

a. a cyclic symmetric proof mass comprising a first surface comprising concentric circular reflectors that define a cavity, wherein the first surface bears spatially orthogonal polar primary and secondary modes of vibration which become degeneratively coupled at a shared resonant frequency in response to rotation about an axis of the cyclic symmetric proof mass;

b. at least one actuator for inducing a primary polar surface acoustic wave of circumferential order n associated with the primary mode; and c. at least one sensor for sensing a secondary polar surface acoustic wave of circumferential order n associated with the secondary mode.

2. A gyroscope as claimed in claim 1, in which the cyclic symmetric proof mass is axisymmetric.

3. A gyroscope as claimed in claim 1, in which the first surface of the cyclic symmetric proof mass is arranged to bear the primary polar surface acoustic wave and the secondary polar surface acoustic wave.

4. A gyroscope as claimed in claim 1, in which the cyclic symmetric proof mass has a predetermined axial depth providing at least a predetermined flexural rigidity in a direction of the axis.

5. A gyroscope as claimed in claim 1, in which the cyclic symmetric proof mass is mounted on a substrate that has a predetermined axial depth providing at least a predetermined flexural rigidity in a direction of the axis.

6. A gyroscope as claimed in claim 1, in which the cyclic symmetric proof mass is circular.

7. A gyroscope as claimed in claim 1, in which the cyclic symmetric proof mass comprises an isotropic body.

8. A gyroscope as claimed in claim 1, in which the cyclic symmetric proof mass comprises an anisotropic body.

9. A gyroscope as claimed in claim 1, in which the at least one actuator for inducing the primary polar surface acoustic wave associated with the primary mode is configured to induce a Raleigh polar surface acoustic wave.

10. A gyroscope as claimed in claim 1, in which at least one of the primary or secondary polar surface acoustic waves comprises a standing polar surface acoustic wave.

11. A gyroscope as claimed in claim 1, wherein the concentric circular reflectors are configured to reflect at least the primary polar surface acoustic wave to form a standing polar surface acoustic wave associated with the primary mode.

12. A gyroscope as claimed in claim 11, in which the concentric circular reflectors are disposed radially outwardly relative to each other to reflect at least the primary polar surface acoustic wave radially inwardly.

13. A gyroscope as claimed in claim 12, in which the concentric circular reflectors are disposed radially outwardly relative to each other to reflect at least the secondary polar surface acoustic wave radially inwardly.

14. A gyroscope as claimed in claim 11, in which the concentric circular reflectors are arranged to reflect polar surface acoustic waves.

15. A gyroscope as claimed in claim 1, in which the concentric circular reflectors comprises nested or concentric reflectors.

16. A gyroscope as claimed in claim 1, in which concentric circular reflectors span predetermined radial widths, wherein the predetermined radial widths are associated with a wavelength of at least one of the primary polar surface acoustic wave or the secondary polar surface acoustic wave.

17. A gyroscope as claimed in claim 1, in which the at least one actuator comprises at least one cyclic symmetrically or axisymmetrically disposed arcuate actuator.

18. A gyroscope as claimed in claim 17, in which the at least one actuator comprises at least one cyclic symmetrically or axisymmetrically disposed arcuate actuator comprises a plurality of cyclic symmetrically disposed arcuate actuators.

19. A gyroscope as claimed in claim 1, in which the least one actuator comprises at least one group of actuators, with each actuator disposed circumferentially by 2π/n rad with respect to an adjacent actuator, cooperable to launch the primary polar surface acoustic wave associated with the primary mode, wherein the n of 2π/n rad is the same as the circumferential order n of the primary polar surface acoustic wave.

20. A gyroscope as claimed in claim 19, in which the at least one actuator comprises at least two groups of actuators, with each group disposed circumferentially by 2π/2n rad with respect to an adjacent group, cooperable to launch the primary polar surface acoustic wave associated with the primary mode, wherein the n of 2π/2n rad is the same as the circumferential order n of the primary polar surface acoustic wave.

21. A gyroscope as claimed in any claim 1, in which the at least one sensor comprises at least one cyclic symmetrically or axisymmetrically disposed arcuate sensor.

22. A gyroscope as claimed in claim 21, in which the at least one sensor comprises at least one cyclic symmetrically or axisymmetrically disposed arcuate sensor comprising a plurality of cyclic symmetrically disposed arcuate sensors.

23. A gyroscope as claimed in claim 1, in which the at least one sensor comprises at least one group of sensors, with each sensor disposed circumferentially by 2π/n rad with respect to an adjacent sensor, cooperable to detect a characteristic of the primary polar surface acoustic wave associated with the primary mode, wherein the n of 2π/n rad is the same as the circumferential order n of the primary polar surface acoustic wave.

24. A gyroscope as claimed in claim 23, in which the at least one sensor comprises at least two groups of sensors, with each group disposed circumferentially by 2π/2n rad with respect to an adjacent group, cooperable to detect a characteristic of the primary polar surface acoustic wave associated with the primary mode, wherein the n of 2π/2n rad is the same as the circumferential order n of the primary polar surface acoustic wave.

25. A gyroscope as claimed in claim 1, in which the at least one sensor comprises at least one group of sensors, with each sensor disposed circumferentially by 2π/n rad with respect to an adjacent sensor, cooperable to detect a characteristic of the secondary polar surface acoustic wave associated with the secondary mode wherein the n of 2π/n rad is the same as the circumferential order n of the secondary polar surface acoustic wave.

26. A gyroscope as claimed in claim 25, in which the at least one sensor comprises at least two groups of sensors, with each group disposed circumferentially by 2π/2n rad with respect to an adjacent group, cooperable to detect a characteristic of the secondary polar surface acoustic wave associated with the secondary mode, wherein the n of 2π/2n rad is the same as the circumferential order n of the secondary polar surface acoustic wave.

27. A gyroscope as claimed in claim 1, comprising circuitry arranged to determine at least angular rate, Ω, from data associated with at least the secondary polar surface acoustic wave.

28. A gyroscope as claimed in claim 27, wherein the circuitry to determine at least angular rate, Ω, from data associated with at least the secondary polar surface acoustic wave comprises circuitry to determine at least angular rate, Ω, from at least one or more than one of the amplitude, $A_p$, of the primary polar surface acoustic wave, the amplitude of the secondary surface acoustic wave, $A_s$, and a radial width, l, associated with at least one reflector.

29. A gyroscope as claimed in claim 28, in which the circuitry to determine at least angular rate, Ω, from at least one or more than one of the amplitude, $A_p$, of the primary polar surface acoustic wave, the amplitude of the secondary polar surface acoustic wave, $A_s$, and a radial width, L, associated with at least one reflector comprise circuitry to determine a ratio of the amplitude, $A_p$, of the primary polar surface acoustic wave, the amplitude of the secondary polar surface acoustic wave, $$A_s, \text{ given by } \frac{A_s}{A_p} = \left(\frac{\Omega}{\omega}\right) K(n) e^{2sl}, \text{ where}$$

K(n) is the Bryan factor for the cyclic symmetric proof mass and is determined by the geometrical configuration, S is related to the height of the reflector and its elastic properties, l is the nondimensional radial width spanned by the at least one reflector corresponding to L, ω is the angular frequency of at least one, or both, of the secondary polar surface acoustic wave or the primary polar surface acoustic wave, and Ω is said at least angular rate.

30. A gyroscope as claimed in claim 28, in which the circuitry to determine at least angular rate, Ω, from at least one or more than one of the amplitude, $A_p$, of the primary polar surface acoustic wave, the amplitude of the secondary polar surface acoustic wave, $A_S$, and a radial width, L, associated with at least one reflector comprise circuitry to determine, Ω, from:

$$\Omega = \frac{A_s \omega}{A_p K(n) e^{2sl}},$$

where $A_p$ is the amplitude of the primary polar surface acoustic wave, $A_s$ is the amplitude of the secondary polar surface acoustic wave, K(n) is the Bryan factor of the cyclic symmetric proof mass and is determined by the geometrical configuration, S is related to the height of the reflector and its elastic properties, l is the nondimensional radial width spanned by the at least one reflector corresponding to L, ω is the angular frequency of at least one, or both, of the secondary polar surface acoustic wave or the primary polar surface acoustic wave, and Ω is said at least angular rate.

* * * * *